(12) United States Patent
Silberbauer

(10) Patent No.: US 8,789,681 B2
(45) Date of Patent: Jul. 29, 2014

(54) CONVEYOR FOR CONVEYING PRINTED PRODUCTS AND SYSTEM PROVIDED WITH SUCH A CONVEYOR

(75) Inventor: Guenther Silberbauer, Uerkheim (CH)

(73) Assignee: Muller Martini Holding AG, Hergiswil (CH)

( * ) Notice: Subject to any disclaimer, the term of this patent is extended or adjusted under 35 U.S.C. 154(b) by 524 days.

(21) Appl. No.: 12/815,878

(22) Filed: Jun. 15, 2010

(65) Prior Publication Data

US 2010/0314218 A1 Dec. 16, 2010

(30) Foreign Application Priority Data

Jun. 15, 2009 (EP) .................................. 09162682

(51) Int. Cl.
*B65G 47/56* (2006.01)

(52) U.S. Cl.
USPC ............................ 198/435; 198/426; 198/431

(58) Field of Classification Search
USPC .................... 270/52.01, 52.16, 58.01, 58.29; 198/426, 431, 435, 437, 457.01, 198/457.03; 271/3.19, 3.21, 69, 189, 302
See application file for complete search history.

(56) References Cited

U.S. PATENT DOCUMENTS

| | | | | |
|---|---|---|---|---|
| 3,734,264 A * | 5/1973 | Stumpf | ..................... | 198/347.4 |
| 4,604,704 A * | 8/1986 | Eaves et al. | .................... | 700/230 |
| 4,867,299 A | 9/1989 | Fukuoka et al. | | |
| 5,720,479 A * | 2/1998 | Yamaguchi et al. | .......... | 271/288 |
| 6,659,445 B2 * | 12/2003 | Boss | ............................ | 271/9.13 |
| 6,681,916 B2 * | 1/2004 | Hiroki | ......................... | 198/347.1 |
| 6,897,625 B2 * | 5/2005 | Brixius et al. | .................. | 318/69 |
| 7,159,860 B2 * | 1/2007 | Sasahara | ..................... | 270/58.14 |
| 7,263,409 B2 * | 8/2007 | LeVasseur et al. | ............ | 700/228 |
| 7,681,712 B2 * | 3/2010 | Hara et al. | ................. | 198/461.1 |
| 2008/0031706 A1 | 2/2008 | Silberbauer | | |
| 2009/0114508 A1 | 5/2009 | Hara et al. | | |

FOREIGN PATENT DOCUMENTS

| | | |
|---|---|---|
| DE | 2 218 683 A1 | 10/1973 |
| DE | 10 2004 038 284 A1 | 2/2006 |
| EP | 1 666 390 A1 | 6/2006 |
| EP | 1 880 863 A1 | 1/2008 |
| EP | 1 932 788 A1 | 6/2008 |
| EP | 08405266.1 | 10/2008 |
| FR | 2 804 419 A1 | 8/2001 |
| JP | S6422758 A | 1/1989 |
| JP | 2010-100059 A | 5/2010 |

(Continued)

OTHER PUBLICATIONS

European Search Report for Application No. EP09162682.0, dated Jan. 21, 2010.

(Continued)

*Primary Examiner* — Leslie A Nicholson, III

(74) *Attorney, Agent, or Firm* — Venable LLP; Robert Kinberg; Tamatane J. Aga

(57) ABSTRACT

An apparatus for conveying printed products, includes a first accumulating section and at least one second accumulating section to convey the printed products from at least one intake area to at least one discharge area. The apparatus includes a feeding device to supply the printed products to one of the first or second accumulating sections in the at least one intake area. The apparatus further includes a discharge device to remove the printed products from one of the first or second accumulating sections in the at least one discharge area.

17 Claims, 5 Drawing Sheets

(56) References Cited

FOREIGN PATENT DOCUMENTS

| WO | WO-02/02444 A1 | 1/2002 |
| WO | WO-2005/037689 A1 | 4/2005 |
| WO | WO-2007/055112 A1 | 5/2007 |
| WO | WO-2007/067049 A1 | 6/2007 |
| WO | WO-2008/042294 A2 | 4/2008 |
| WO | WO-2008-074327 A1 | 6/2008 |

OTHER PUBLICATIONS

Office Action issued in Japanese Patent Application No. 2010-134866 dated May 7, 2014.

* cited by examiner

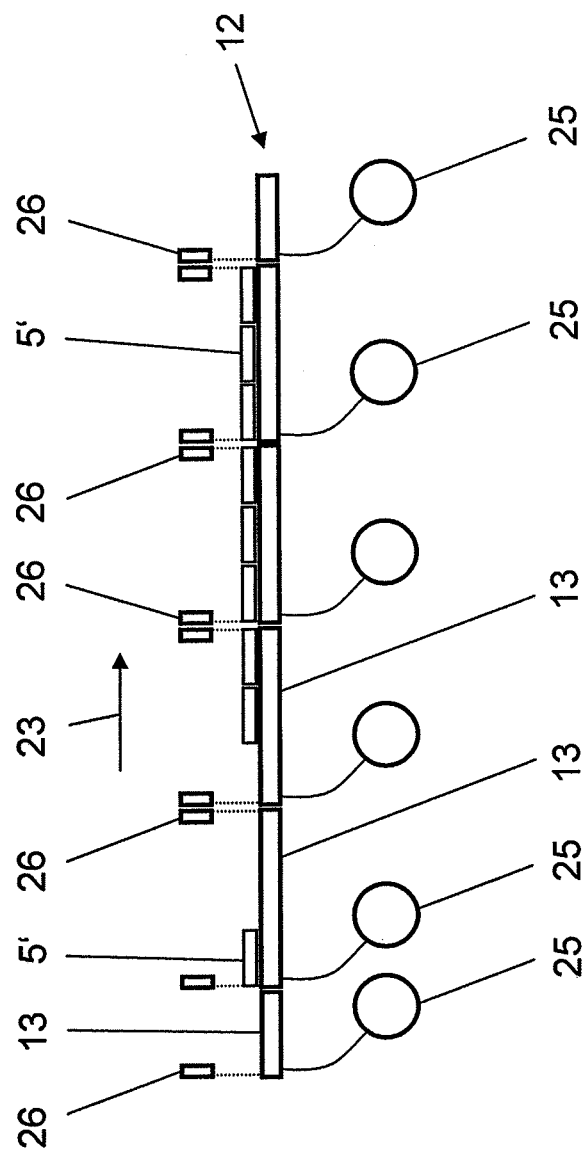

CONVEYOR FOR CONVEYING PRINTED PRODUCTS AND SYSTEM PROVIDED WITH SUCH A CONVEYOR

CROSS-REFERENCE TO RELATED APPLICATION

This application claims the priority of European patent application No. 09162682.0, filed on Jun. 15, 2009, the subject matter of which is incorporated herein by reference.

BACKGROUND OF THE INVENTION

The invention relates to an apparatus for conveying printed products and a system provided with such an apparatus.

Conveyors have been generally disclosed in the art. An accumulating section of a conveyor can be provided, for example, with a belt or rollers on which the printed products are conveyed from the intake area to the discharge area. Such conveyors are used during the production of printed products, for example to convey book blocks. With the digital book production, paper webs or individual sheets are imprinted by a digital printing press and book blocks are thus produced which are provided with a cover during a further processing step, for example in a perfect binder. Interlinked digital book production systems, such as the one described in European patent document No. 08405266.1, permit a high output. Books may thus be produced in series with a large number of copies as well as in series with a small number of copies.

However, if a system of this type must be shut down, for example due to a malfunction in a perfect binder, this not only results in a loss of time, but also causes a high amount of waste material.

Short-time interruptions can be compensated for by the conveyor by correspondingly adapting the speed or by allowing the printed products to accumulate one behind the other such that the spacing is reduced to "zero" and the printed products will touch each other. The conveyor can thus form a buffer zone during an interruption, but only for a limited number of products.

Conveyors with accumulating sections are disclosed in the art where the printed products are accumulated to contact each other. Transport systems with slip are used for this, where these systems reduce the transporting effect during the accumulation. However, the clocking rates and buffer locations for these systems are limited. Also disclosed are so-called spiral towers of which two are generally arranged in series. Spiral towers of this type always comprise a plurality of windings in which the printed products can be stored temporarily with the aid of diverters. In the process, a direct connection is created between two processing operations. If a malfunction occurs in the following machine, the diverters arranged in the conveyor redirect the product flow to a first spiral tower which conveys the products, for example, in upward direction. A second spiral tower can be connected in series and can then convey the printed products once more in downward direction. As a result of the spiral arrangement of the transporting system, it is possible to temporarily store a relatively high number of printed products until the capacity limit is reached. However, during the re-introduction of the printed products into the conveyor with the aid of the diverters, the sequence of the printed products is changed. In addition, such spiral towers require a relatively large amount of space and have a comparatively involved construction.

SUMMARY

It is an object of the invention to create a conveyor of the aforementioned type which may provide a considerably higher buffering effect in the event of a malfunction and which may maintain the sequence of the printed products.

The above and other objects are accomplished according to one aspect of the invention where there is provided an apparatus for conveying printed products which, in one embodiment, includes a first accumulating section and at least one second accumulating section to convey the printed products from at least one intake area to at least one discharge area; a feeding device to supply the printed products to one of the first or second accumulating sections in the at least one intake area; and a discharge device to remove the printed products from one of the first or second accumulating sections in the at least one discharge area.

According to one embodiment, a dynamic change between the accumulating sections may be permitted. By reducing the conveying speed, printed products may be accumulated on these accumulating sections and longer interferences may thus be bridged without having to shut down the printing press while the sequence of the printed products is additionally maintained. This may be referred to as the "first in-first-out" principle ("FIFO"). This embodiment may be advantageous for interlinked systems, where it may allow for the uncoupling of those areas where the process is interrupted, such that the preceding machines need not be stopped immediately. The embodiment may make a contribution to the total efficiency of such an interlinked system.

According to another embodiment, the accumulating sections of the conveyor may have one or more intake and discharge areas.

According to a further embodiment, the printed products, in the region of the accumulating sections, may be controlled such that they do not come in contact with each other.

According to one embodiment, the feeding device and/or the discharge device may be provided with a lift having at least one upper and one lower table, where the accumulating sections may be arranged in two planes, one above the other. A lift provided according to one embodiment may permit a particularly fast change between the two accumulating sections. A conveying section that may be connected to a lift movement, according to one embodiment, may convey the individual printed products initially in a first transporting direction and subsequently in a second transporting direction, where the latter may be offset by approximately 90 degrees, relative to the first one. For example, if two accumulating sections are provided and arranged one above the other, then two conveying sections may correspondingly also be connected to the lift. While the one conveying section may accept printed products from the upstream-arranged processing device, the other conveying section may convey the previously accepted printed products in a direction transverse to the accumulating section. According to one embodiment, the two planes may alternate and the lift may switch during the gap in the product flow to be supplied.

According to another embodiment, the two lift tables and thus also the conveying sections arranged thereon may be positioned at half the vertical distance at which the accumulating sections are arranged relative to each other. If the lift is in the lower position, then the position of the upper conveying section may correspond to that of the feeding section from the upstream-arranged processing device. The lower conveying section in that case can convey the products in transverse direction to the lower accumulating section. This type of arrangement may permit a high clocking frequency because the printed products are separated in the gap between the supplied printed products and because the products are additionally distributed to a plurality of accumulating sections.

In accordance with this embodiment, since these accumulating sections are arranged one above the other, the required basis may be kept small, where three or more accumulating sections may thus also be arranged without problem one above the other.

In another embodiment, the printed products may be conveyed with the feeding device and/or the discharge device essentially transverse to the transporting direction of the first or the second accumulating section.

According a further embodiment, at least one of the accumulating sections may be divided into at least two zones which can respectively accommodate a specific number of printed products, for example book blocks. For example, a simple discharge area to the side may thus be provided, wherein a plurality of such discharge areas or branches to the side may also be provided. The zones may be controlled separately and may include individual drives, wherein this permits an especially dense arrangement of the printed products without the products coming in contact.

The conveyor according one embodiment may allow a far-reaching uncoupling between two processing devices, for example between a printing press for book blocks and a further processing device. If no interruption or malfunctions occur during the production, then the conveyor may convey the printed products in the normal way. In case of an interruption or malfunction, the conveyor may function as a buffer, where the original sequence of the printed products may be maintained ("first in-first out"). An essential cost saving may be possible since the accumulation of waste paper may be reduced and the preceding operation need not be stopped. A higher output may be furthermore possible. As a rule, the following process may run down faster and the buffered printed products may be processed again within a short period of time.

The application furthermore relates to a system for producing printed products, which, according to one embodiment, includes a first processing device to produce the printed products; a second processing device oppositely arranged from the first processing device; a conveyor to convey the printed products from the first processing device to the second processing device, wherein the conveyor comprises a first and at least one second accumulating section; a feeding device to supply the printed products from the first processing device to one of the first or second accumulating sections; and a discharge device to remove the printed products from one of the first or second accumulating sections to supply the printed products to the second processing device.

According to one embodiment, the conveyor may be used as a buffer following the downstream processing device, during the conversion for a new order or in the case of production interruptions. However, the conveyor may also be used for other systems for which a buffering effect is useful. Thus, it can be arranged between two further printing processes, meaning between a first and a second processing device, for example between a perfect binder and a three-way trimmer, or between a three-way trimmer and a book-encasing line for hardcover books, or between a three-way trimmer and a logistic system.

According to another embodiment, a printing press, for example a digital printing press, may be connected to the first processing device. Digital printing presses may make possible the production of a printed product in a single sequence because they do not have a static type form. For example, inkjet printing systems may be used which can continuously print a different printed image and can thus print a book in sequence from the first to the last page. In principle, systems may also be conceivable which include other types of printing presses, for example offset printing presses.

According to another embodiment, the system may be used for producing book blocks, but can also be designed for producing other types of printed products, such as newspapers, brochures and the like.

According to a further embodiment, the conveyor may be controlled based on the "first in-first out" principle. The intake area and the discharge area may be adapted to each other such that the first supplied plane of the accumulating sections is also processed first, thereby avoiding any mix-up of orders during a sequential production.

Additional advantageous features of the invention are disclosed in the dependent claims, the following description, and in the drawing figures.

BRIEF DESCRIPTION OF THE DRAWINGS

The present invention will be more readily understood from the following detailed description when read in conjunction with the accompanying drawings, in which:

FIG. 5 is a schematic representation of an accumulating section of the conveyor, provided with individual drives and sensors for the zones, according to an embodiment of the invention.

DETAILED DESCRIPTION

Figure 1:
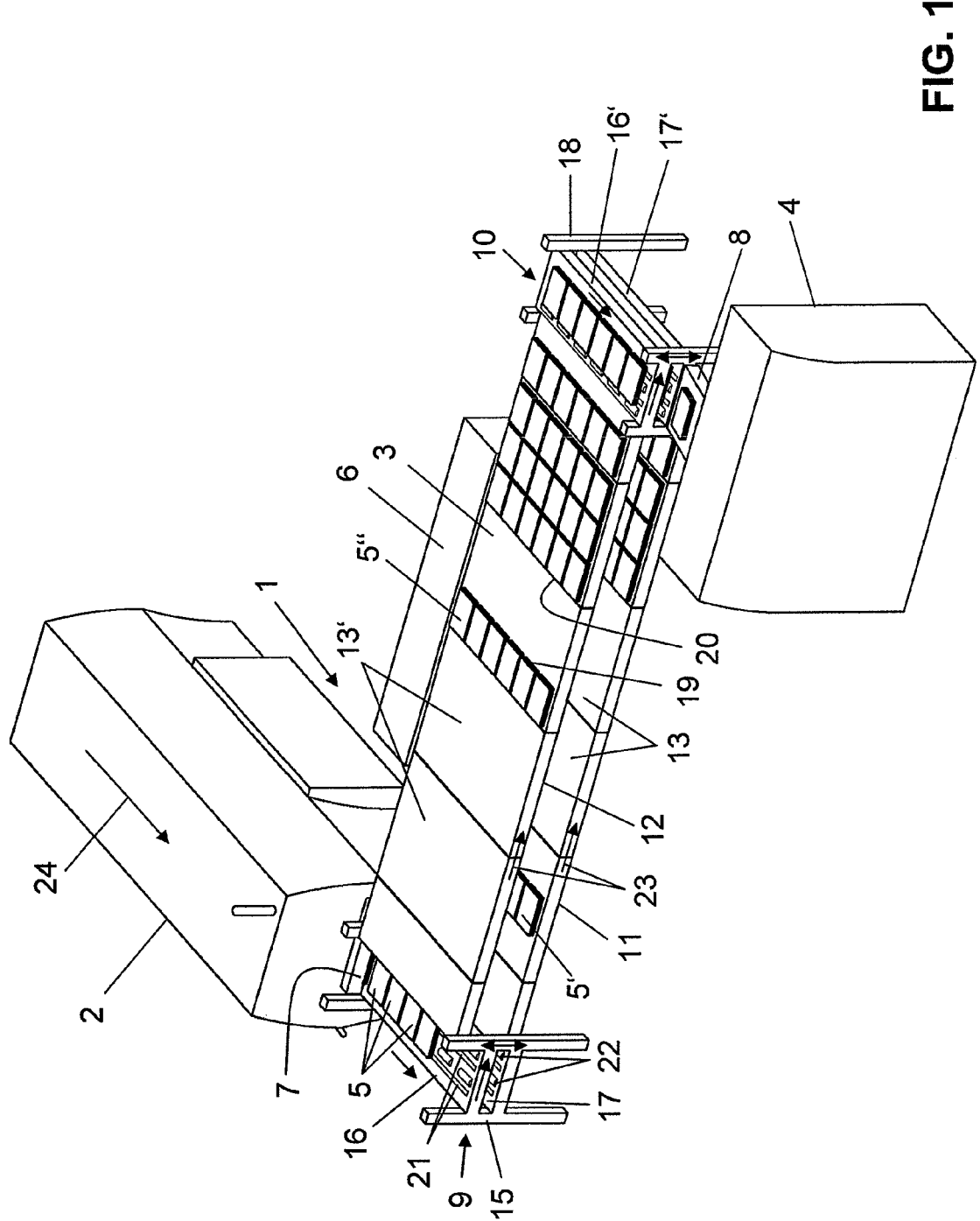
FIG. 1 is a schematic three-dimensional view of a system with a conveyor according an embodiment of the invention.
Figure 2:
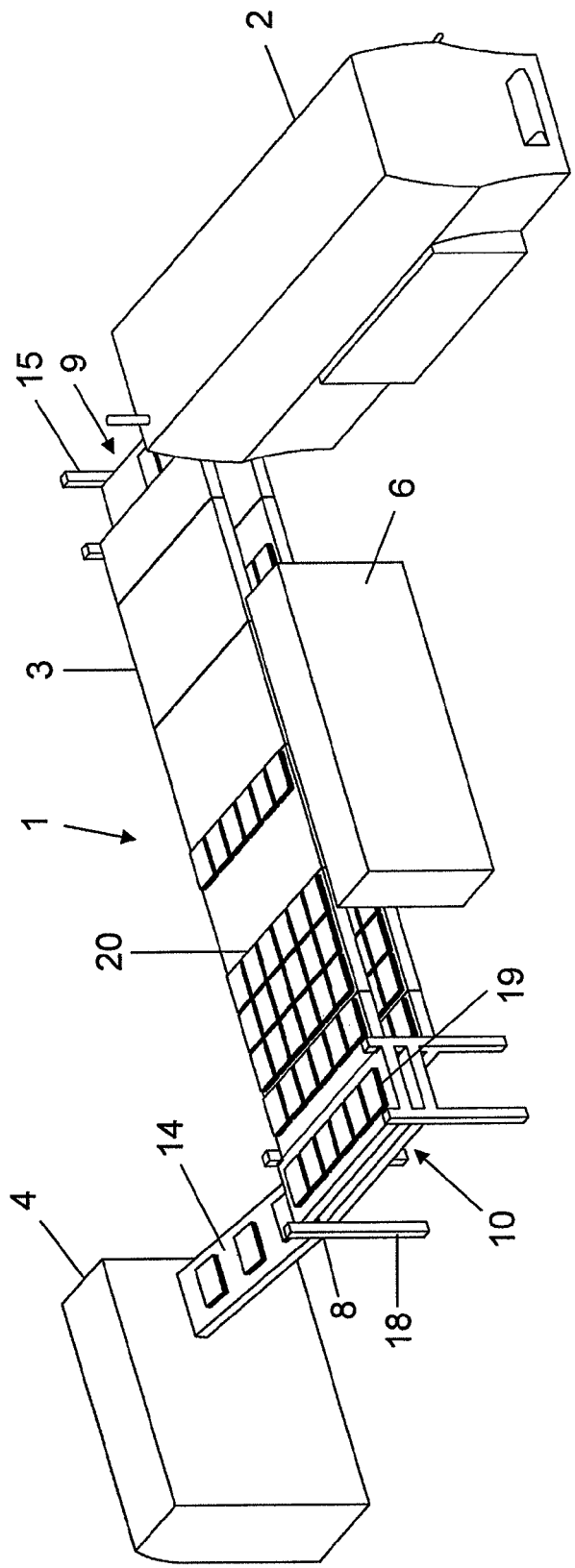
FIG. 2 is an alternative three-dimensional view of the system according to FIG. 1.
Figure 3:
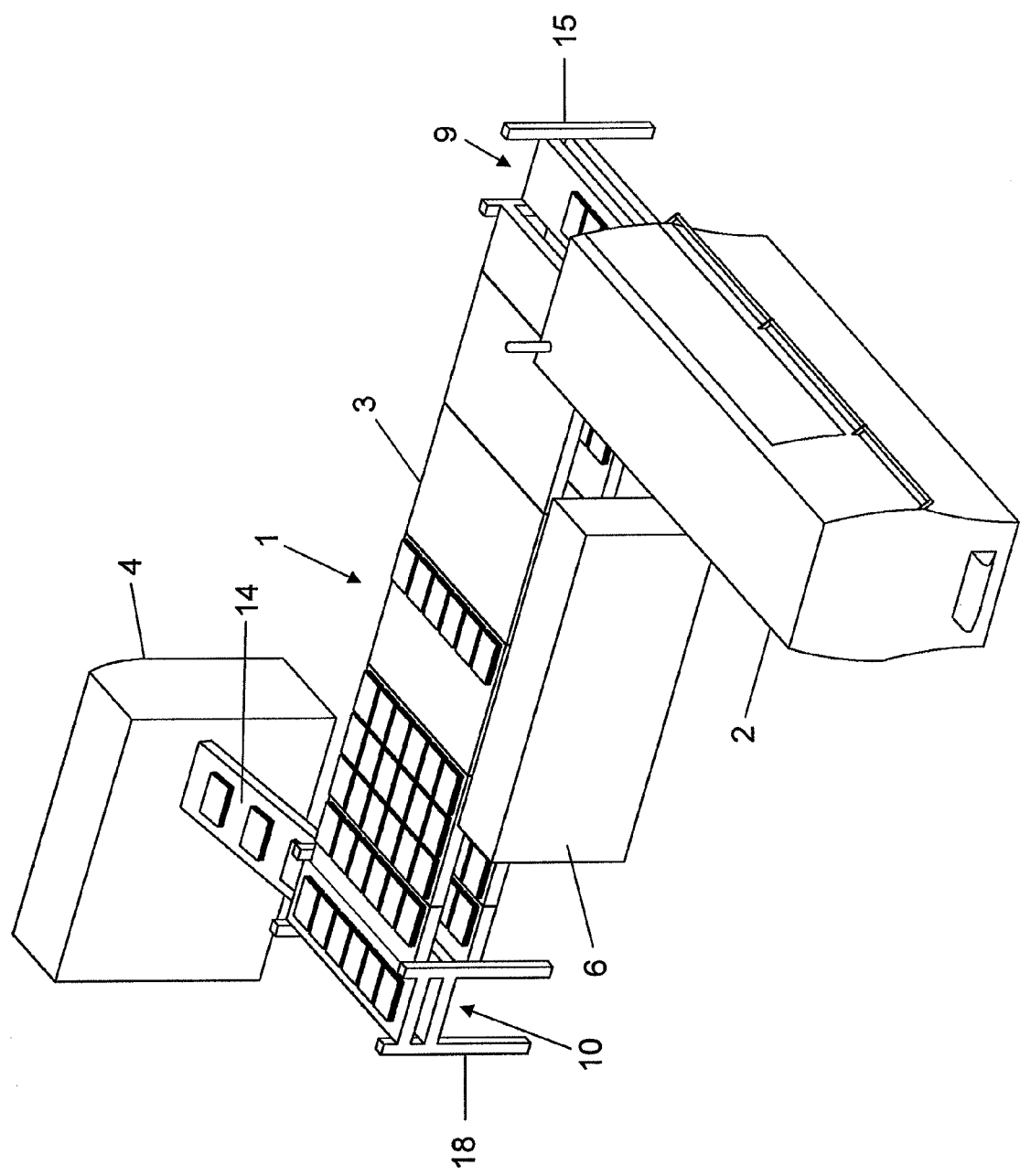
FIG. 3 is a three-dimensional view of the system according to an embodiment of the invention.

The system 1, shown in FIG. 1, for producing printed products 5 is provided with a first processing device 2, for example a gathering machine connected to a printing press, in particular a digital printing press, which is not shown herein. In principle, other processing devices 2 can conceivably also be used. Furthermore provided is a second processing device 4 for the further processing of the printed products 5. The second processing device 4 comprises, for example, a perfect binder with a downstream-connected three-way trimmer, which is not shown herein but is disclosed in the art, for trimming the printed products 5. A conveyor 3 is arranged between the first processing device 2 and the second processing device 4. The first processing device 2, the conveyor 3 and the second processing device 4 essentially form a synchronous line of interlinked, drive-connected transport sections which can extend over the complete system and can also include further devices. The conveyor 3 forms a buffer zone with two planes, wherein the first and lower plane is formed by a first accumulating section 11 and the second, upper plane is formed by a second accumulating section 12. These two accumulating sections 11, 12 are arranged one above the other, as can be seen. The conveyor 3 has an intake area 7 and a discharge area 8. In the intake area 7, the printed products 5 are transferred from the first processing device 2 to the conveyor 3. In the discharge area 8, the printed products are transferred from the conveyor 3 to the second processing device 4.

The intake area 7 of the conveyor 3 is followed by a feeding device 9 which is provided with a first lift 15 having at least one upper table 16 and one lower table 17. Each of the two tables 16, 17 is suitable for accommodating a plurality of printed products 5 which are transferred to the conveyor 3. The conveying of the printed products 5 on the tables 16, 17 takes place with the aid of transport belts 21 and transport rollers 22. With the aid of the feeding device 9 and/or the lift 15, the printed products 5 are respectively moved to a position from which they can be transferred to the first, lower accumulating section 11 or to the second, upper accumulating section 12. Upstream of the discharge area 8, a discharge device 10 follows which essentially can have the same design as the feeding device and is provided with a second lift 18 having an upper table 16' and a lower table 17'. With the aid of the discharge device 10 and/or the lift 18, the printed products 5 are optionally taken over from the first accumulating section 11 or from the second accumulating section 12 and are transferred to the second processing device 4. If the feed-in position for the second processing device 4 is arranged higher up than the discharge device 10, then the transfer of the printed products 5 can occur with the aid of an ascending belt that connects the discharge area 8 and the second processing device 4 and also forms a section of the aforementioned synchronous line.

As mentioned before, the conveyor 3 forms a buffer zone which allows the uncoupling of areas in an interlinked system 1 where processes are interrupted. If an interruption occurs in the second processing device 4, then the first processing device 2, for example the gathering machine and the printing press and in particular the digital printing press connected thereto, need not be stopped immediately. Differences in the speed between the first and the second processing device 2, 4 can thus be compensated by the conveyor 3 which is particularly advantageous for a digital book production system which uses in-line processing, starting with the unprinted roll to the finished book. A system 1 of this type can thus be arranged between a printing line and an adhesive-binding line. For example, a conversion to a new product in the printing line can be carried out during the operation, whereupon the adhesive binding line must be stopped to adjust the feeding of the cover, for example, or to change the type of cover. An interruption of this type can be compensated for by the system 1 and/or its conveyor 3, so that the printing line can continue to operate.

The first and the second accumulating section 11, 12 can be supplied with the aid of the feeding device 9 and the products can be removed with the discharge device 10. Along the path from the feeding device 9 to the first and the second accumulating section 11, 12, a change of the transporting direction by 90 degrees takes place. The same is true for the transport from the first and second accumulating section 11, 12 to the discharge device 10.

With the first lift 15 belonging to the feeding device 9, the printed products 5 that are conveyed to its upper table 16 can optionally be positioned with respect to the first and second accumulating sections 11, 12 and can thus be transferred to these sections. The same is true for the lower table 17. As a result of a lifting movement of the first lift 15, the lower table 17 can be positioned such that printed products 5 can be transferred to the first or to the second accumulating section 11, 12. The second lift belonging to the discharge device 10 also permits a lifting movement of the upper and the lower table 16', 17'. These tables 16', 17' can be positioned relative to the first and the second accumulating section 11, 12, thereby allowing the discharge and/or transport of the printed products 5 to the second processing device 4 in two planes.

The first and the second accumulating sections 11, 12 are each provided with at least two zones 13 and/or 13'. These zones 13, 13' form segmented buffer zones which are provided with individual drives 25 (FIG. 5) and may be controlled on the basis of the "first in-first out" principle. During the production, these zones 13, 13' are controlled such that they convey the printed products 5', 5" from the intake area 7 to the discharge area 8, wherein the printed products 5', 5" do not come in contact with each other. The spacing between the printed products 5' and/or 5" is minimized, such that the highest possible number of printed products 5', 5" can be conveyed on the first and on the second accumulating section 11, 12.

The accumulating sections 11, 12 may be scalable, wherein this scaling relates, for example, to the number of zones 13, 13' as well as the number of items entering and leaving at the intake area 7 and/or the discharge area 8, but also to the number of accumulating sections 11, 12, meaning the number of planes. The aforementioned individual drives 25 are provided with servo motors, for example, which permit a particularly precise and reliable control. The printed products 5, 5' and 5" can be bound books with soft covers or hard covers, but can also be loose or pre-glued book blocks, back-lined book blocks provided with a fly leaf or insert, but also magazines and newspapers. The printed products 5, 5' and/or 5" can furthermore be embodied differently, for example they can have different formats or thicknesses and can also be stacked products.

Figure 4:
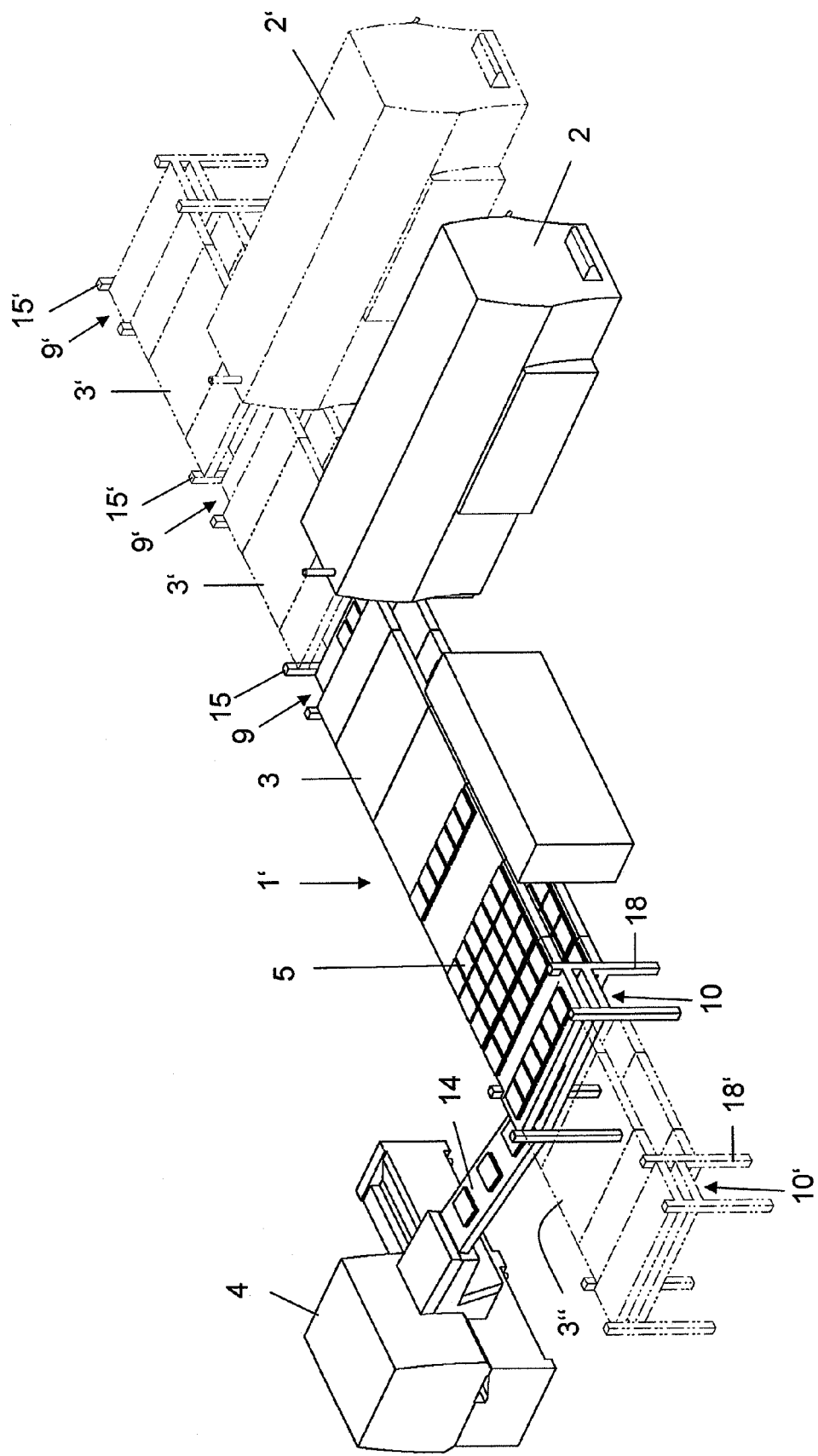
FIG. 4 is a three-dimensional view of the system according to another embodiment of the invention.

FIG. 4 shows a system 1' for which additional conveyors 3', 3" are provided. With this system 1', the feeding device 9 and the discharge device 10 can also transfer the printed products 5 to the conveyors 3' and/or 3" which can thus form additional buffer zones. The conveyors 3' and/or 3" are configured similar or identical to the above-explained conveyor 3 and can also be provided at the end of the conveying section with feed devices 9' and discharge devices 10' from and/or to additional processing devices.

The mode of operation of the conveyor and/or system, according to an embodiment, is explained in further detail in the following.

With the aid of the feeding device 9, the printed products 5 are removed directly from the first processing device 2 and supplied at the intake area 7 to the conveyor 3. As can be seen, the printed products 5 are conveyed transverse to a transporting direction 23 of the accumulating sections 11, 12 of the conveyor 3, meaning the backs of the printed products 5 are oriented transverse to a transporting direction 24 of the first processing device 2 and the widths of the printed products 5 are accordingly oriented lengthwise to this transporting direction 24. A one-dimensional collection of printed products 5 in the region of the conveyor 3 forms a product row 19. A plurality of product rows 19 that follow each other in transporting direction 23 form a product group 20.

During the intake of the printed products 5, the spacing between adjacent product rows 19 is compressed to a minimum, with the advantage that a comparably high number of printed products 5 can be conveyed and/or accumulated on the conveyor 3. According to one embodiment, each product row 19 contains printed products 5 with the same spine length. However, the spine lengths, the widths and the thicknesses of the printed products 5 within a product row 19 can also differ without a problem. The sequence of the printed products 5 conveyed on the conveyor 3 may be maintained, thus making possible a conveying operation based on the "first in-first out" principle.

The lower table 17 of the lift 15 for the feeding device 9 takes over the printed products 5 with synchronized speed, directly from the first processing device 2. The printed products 5 in this case may not touch each other. To ensure a secure transport, the printed products 5 can also be secured in place, especially if these are loose book block stacks, by temporarily gluing them on in the region of the product spines.

With the aid of a sensor that is not shown herein, the complete occupation of the lower table 17 may be monitored and reported, for example to a control unit housed inside a switching cabinet 6. The lift 15 of the feeding device 9 can carry out a lifting movement in a gap, not shown herein, between two printed products 5 arranged adjacent in transporting direction 24 of the first processing device 2. Following such a lifting movement, the printed products 5 are supplied to the other accumulating section, for example the upper, second accumulating section 12. The printed products 5 are supplied by being conveying in transverse direction on the upper table 16 or the lower table 17. The transport belts 21 are used for transporting the printed products 5 on the tables 16 and 17 in transporting direction 24 of the first processing device 2, for example, while the transport rolls 22 are used for conveying them in transporting direction 23 of the accumulating sections 11, 12, wherein the transport rolls lift the printed products 5 from the transport belts 21. The tables 16, 17 consequently form respectively one conveying section where the transporting direction for the printed products 5 is reversed by 90 degrees. Transport devices of this type are disclosed in the art and will therefore not be explained further herein. Pneumatic devices can be used for the aforementioned lifting movement, wherein the lifting height depends on the specific design of the system 1 and may be, for example, approximately 10 mm. However, other lifting heights are conceivable as well.

The first and the second accumulating sections 11, 12 may directly adjoin the feeding device 9 and/or its tables 16, 17, in view of the planned synchronous operation. As explained, the printed products 5', 5" on the accumulating sections 11, 12 may be transported within the zones 13, 13'. Sensors 26, shown in FIG. 5, which are designed as occupation sensors can be used to control the occupation of these zones 13, 13' with printed products 5', 5". Each of these zones 13, 13' can be provided with such sensors 26 and can accommodate at least one product row 19. In transporting direction 24, for example, a zone 13, 13' may, for example, have a length of approximately 800 mm and in transporting direction 23 it may, for example, have a length of approximately 1250 mm. Of course, other dimensions are possible as well. The printed products 5', 5" are arranged such that the spacing between them is minimal and can also be controlled with sensors, with the aid of the control unit arranged inside the switching cabinet 6.

On the output side, the first and the second accumulating sections 11, 12 directly adjoin the discharge device 10 and/or its tables 16', 17'. The discharge device 10 transfers the printed products 5', 5" with synchronized speed to the ascending belt 14 and/or directly to the second processing device 4. The ascending belt 14 can be provided with a separate drive which may be provided with a synchronous motor. In the region of the ascending belt 14, the printed products 5' and/or 5" also do not come in contact. With the aid of a sensor that is not shown herein the complete emptying of the discharge device 10 can be monitored and reported to the control unit. Following the emptying of the one table 16', 17', the lift 18 for the discharge device 10 carries out a lifting movement which can also be realized with pneumatic devices. Following such a lifting movement, the products 5' and/or 5" are discharged from the other table 17', 16' and/or from the first or second accumulating section 11, 12. The ascending belt 14, for example embodied as conveying belt, takes over the printed products 5', 5" with a synchronized speed from the discharge device 10, wherein the edges of the printed products 5', 5" can be detected with a non-depicted sensor.

If an additional conveyor 3" is connected to the discharge device 10, as shown in FIG. 4, the printed products 5', 5" can be moved with the discharge device 10 to this additional conveyor 3" in case of an interruption, meaning before these printed products 5', 5" are transferred to the ascending belt 14. In that case, the aforementioned "first in-first out" principle may be maintained. The same is true for the synchronous operation and the minimum distance between the printed products 5' and/or 5". The conveyors 3', 3" can also comprise a plurality of zones 13, 13'. If no interruptions occur during the production, these additional conveyors 3', 3" are not used. The conveyor 3 then takes over the transport of the printed products 5', 5". In the case of a longer interruption in the second processing device 4 or any other following device that is not shown herein, the printed products 5', 5" can be stored on the conveyor 3 and optionally also on one or both of the additional conveyors 3' and/or 3". The printed products 5', 5" stored on the additional conveyors 3' and/or 3" are then transferred to the conveyor 3 and/or directly to the ascending belt 14. The sequence of steps is essentially the same during a change in the production, wherein a perfect-binding line is stopped, for example, and the printing operation can be continued with new printed products 5.

The printed products 5 are thus conveyed in the system and on its conveyor 3 in at least two planes. As explained in the above, it is possible to change dynamically between these planes in the manner of a tandem operation, to separate the longitudinal and transverse conveying operations. The control unit can be embodied such that the conveying positions of the printed products 5 in the conveyor 3 are controlled virtually with the aid of a path control. In that case, the printed products 5 are tracked with the aid of an identification characteristic, for example a barcode or a data matrix code.

Insofar as the additional conveyors 3', 3" are embodied with additional feeding devices 9' and additional discharge devices 10', these can be used to divert the product flow to a different further processing operation. Thus, one or more intake areas 7 can also follow one or more discharge areas 8. The complete system 1 in that case operates as distribution system with buffer function. With the aid of the additional conveyors 3', 3" the printed products 5 can be stored temporarily and supplied again later on.

The invention has been described in detail with respect to various embodiments, and it will now be apparent from the foregoing to those skilled in the art, that changes and modifications may be made without departing from the invention in its broader aspects, and the invention, therefore, as defined in the appended claims, is intended to cover all such changes and modifications that fall within the true spirit of the invention.

What is claimed is:

1. An apparatus for conveying printed products, comprising:
    a conveyor having a first accumulating section to convey the printed products in a transporting direction and at least one second accumulating section to convey the printed products in the same transporting direction, wherein the first and second accumulating sections are configured to convey the printed products in parallel from at least one intake area to at least one discharge area, wherein the first and second accumulating sections are each divided into at least two zones;
    an individual drive provided for each of the at least two zones of each of the first and second accumulating sections, wherein the individual drives are configured to convey the printed products from the at least one intake area to the at least one discharge area;

a feeding device configured to supply the printed products in sequence to the first and second accumulating sections in the at least one intake area in order to simultaneously convey printed products on the first and second accumulating sections; and a discharge device configured to remove the printed products from the first and second accumulating sections in the at least one discharge area, wherein the individual drives are separately controlled and configured such that the sequence of printed products supplied by the feeding device is maintained for printed products removed by the discharge device from the first and second accumulating sections;

wherein at least one of the feeding device and the discharge device comprises a lift;

wherein the lift comprises an upper and a lower table.

2. The apparatus according to claim 1, wherein the first and second accumulating sections are arranged one above the other.

3. The apparatus according to claim 1, wherein upper and lower tables are positioned relative to each other at half a vertical distance of the first and second accumulating sections.

4. The apparatus according to claim 1, wherein at least one of the feeding device and the discharge device convey the printed products in a direction essentially transverse to a transporting direction of one of the first or second accumulating sections.

5. The apparatus according to claim 1, wherein the at least two zones are divided essentially transverse to a transporting direction of a respective one of the first and second accumulating section.

6. The apparatus according claim 1, wherein the first and second accumulating sections are identical.

7. The apparatus according to claim 1, further comprising:
at least one sensor to detect and control conveying positions of the printed products.

8. The apparatus according to claim 7, further comprising a path control to virtually control the conveying positions of the printed products.

9. The apparatus according to claim 1, wherein each of the printed products includes an identification characteristic used to track the printed products, respectively.

10. The apparatus according to claim 9, wherein the identification characteristic is one of a barcode or a data matrix code.

11. A system for producing printed products, comprising:
a first processing device to produce the printed products; a second processing device oppositely arranged from the first processing device;
a conveyor to convey the printed products from the first processing device to the second processing device, wherein the conveyor comprises a first accumulating section to convey the printed products in a transporting direction and at least one second accumulating section to convey the printed products in the same transporting direction, wherein the first and second accumulating sections are configured to convey the printed products in parallel from the first processing device to the second processing device; wherein at least one of the first and second accumulating sections is divided into at least two zones;

an individual drive provided for each of the at least two zones, wherein the individual drives are configured to convey the printed products from the at least one intake area to the at least one discharge area;

a feeding device configured to supply the printed products in sequence from the first processing device to the first and second accumulating sections in order to simultaneously convey printed products on the first and second accumulating sections; and a discharge device configured to remove the printed products from the first and second accumulating sections to supply the printed products to the second processing device, wherein the individual drives are separately controlled and configured such that the sequence of printed products supplied by the feeding device is maintained for printed products removed by the discharge device.

12. The system according to claim 11, further comprising at least one printing press coupled to the first processing device.

13. The system according to claim 11, wherein the printed products comprise book blocks supplied to the first and second accumulating sections of the conveyor.

14. The system according to claim 11, wherein the conveyor is controlled on the basis of a "first in-first out" principle.

15. The system according to claim 11, wherein the feeding device and the discharge device convey the printed products in a direction essentially transverse to a transporting direction of the conveyor.

16. The system according to claim 11, further comprising:
at least one additional conveyor coupled to the conveyor; and
at least one of an additional feeding device and an additional discharge device coupled to the at least one additional conveyor.

17. The system according to claim 16, wherein during interruptions in system operation, the printed products are removable from the system, are storable temporary on the at least one additional conveyor and are feedable to the system again with the at least one additional conveyor.

* * * * *